(12) United States Patent
Matsuda

(10) Patent No.: US 7,940,289 B2
(45) Date of Patent: May 10, 2011

(54) PRINTER AND PULSE MOTOR CONTROL METHOD

(75) Inventor: Okiharu Matsuda, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 142 days.

(21) Appl. No.: 12/393,161

(22) Filed: Feb. 26, 2009

(65) Prior Publication Data
US 2009/0309950 A1     Dec. 17, 2009

(30) Foreign Application Priority Data

Jun. 12, 2008 (JP) ................................. 2008-154292

(51) Int. Cl.
 *B41J 2/00*     (2006.01)
 *B41J 11/00*     (2006.01)
(52) U.S. Cl. ........................... 347/218; 347/19; 347/104
(58) Field of Classification Search ................. 347/218, 347/19, 14, 17, 167, 104
See application file for complete search history.

(56) References Cited

U.S. PATENT DOCUMENTS
6,719,396 B2 * 4/2004 Anzai .............................. 347/19

FOREIGN PATENT DOCUMENTS
| JP | 58-069479 | 4/1983 |
| JP | 06-070597 | 3/1994 |
| JP | 2007-30263 | 2/2007 |
| JP | 2007-282308 | 10/2007 |
| JP | 2008-001049 | 1/2008 |

OTHER PUBLICATIONS

Machine-generated translation of JP 2008-001049, published on Jan. 2008.*
Machine-generated translation of JP 06-070597, published on Aug. 1992.*
Machine-generated translation of JP 2007-282308, published on Oct. 2007.*
EP 09002760.8, European Search Report, Sep. 21, 2009.

* cited by examiner

*Primary Examiner* — Huan H Tran
(74) *Attorney, Agent, or Firm* — Patterson & Sheridan, LLP

(57) ABSTRACT

In a portable printer that uses a pulse motor for feeding a recording medium and includes a printing head that prints the recording medium, a printer controller that controls the printing head, and a pulse motor controller that controls the pulse motor, rest level setting information having rest levels and rest times set in correspondence to one another is previously stored, the elapsed time after a printing process is started is counted, the operating time of the pulse motor is counted, a rest level is determined based on the elapsed time after the printing process is started and the operating time of the pulse motor, a rest time is set by referring to the rest level setting information based on the determined rest level and a rest process is performed based on the thus set rest time.

2 Claims, 4 Drawing Sheets

Setting of interruption time of rest level
| Level | Rest time (sec) | Feed duty over 100% Rest time |
|---|---|---|
| Normal | 0.0 | 0 |
| 1 | 0.0 | 0 |
| 2 | 1.4 | 3.8 |
| 3 | 1.7 | 4.7 |
| 4 | 2.1 | 5.8 |
| 5 | 2.6 | 7.1 |
| 6 | 3.2 | 8.7 |
| 7 | 4.0 | 10.7 |
| 8 | 4.9 | 13.2 |
| 9 | 5.9 | 16.1 |
| 10 | 7.3 | 19.7 |
| 11 | 8.9 | 24.1 |
| 12 | 10.9 | 29.5 |
| 13 | 13.4 | 36.1 |
| 14 | 16.3 | 44.2 |
| 15 | 20.0 | 54 |
| 16 | 24.4 | 66 |
| 17 | 29.9 | 80.7 |
| 18 | 36.5 | 98.6 |
| 19 | 44.6 | 120.5 |
F I G. 3
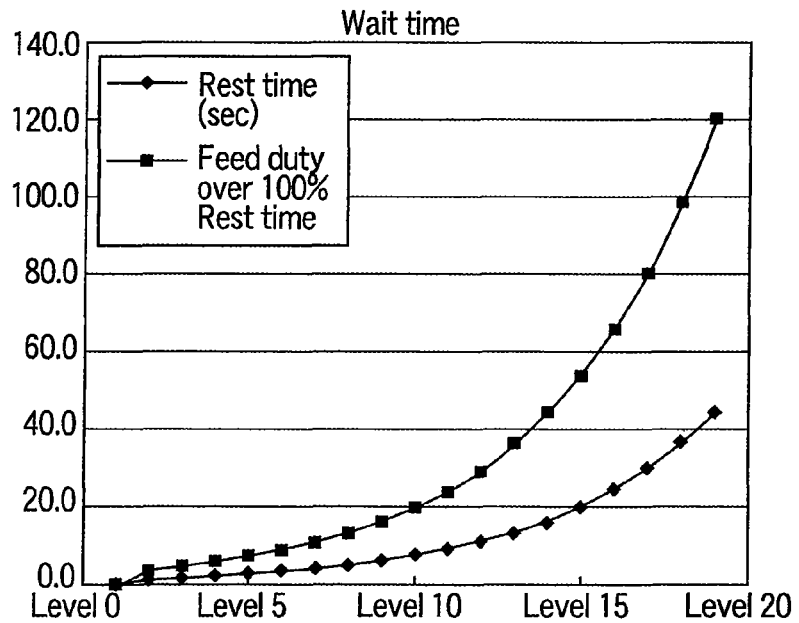
F I G. 4

PRINTER AND PULSE MOTOR CONTROL METHOD

CROSS-REFERENCE TO RELATED APPLICATIONS

This application is based upon and claims the benefit of priority from the prior Japanese Patent Application No. 2008-154292, filed Jun. 12, 2008, the entire contents of which are incorporated herein by reference.

TECHNICAL FIELD

This invention relates to a portable printer using a thermal head for printing, for example.

BACKGROUND

Conventionally, as a portable printer, there is provided a thermal printer on which a thermal head having a plurality of heating elements arranged in the width direction of paper to be printed is mounted. The thermal printer is generally driven by battery power. In the case of the printing operation by a thermal printer described in Jpn. Pat. Appln. publication of patent applications No. 2007-30263, which is a patent document of a Japanese patent application, various information items can be printed by activating those of the plural heating elements which correspond to portions to be printed.

In the portable printer, paper is fed to a setting position of the thermal head by driving a platen roller set to face the thermal head by use of a pulse motor.

However, the temperature of the pulse motor rises when the pulse motor is continuously operated. If the pulse motor is continuously used and the temperature of the pulse motor becomes a preset temperature or higher, there occurs a problem that the pulse motor may be broken.

In order to prevent the occurrence of breakage due to a temperature rise, in some printers the operation of the pulse motor is controlled, by use of a temperature sensor, so as to keep the temperature of the pulse motor lower than a preset temperature. However, since the temperature sensor is expensive, a problem that the printer cannot be realized at low cost occurs.

SUMMARY

According to one embodiment of the invention, an object is to provide a portable printer capable of preventing an excessive temperature rise of the motor at low cost.

According to one aspect of this invention, there is provided A printer having a pulse motor for feeding a recording medium and comprises a printing head that prints information items onto the recording medium, a printer controller for controlling the print head, a first counter for counting an elapsed time after a printing process is started, a counter for counting operating time of the pulse motor, a determining unit determining a rest level based on times counted by the first and second counters, and a controller that sets a rest time based on the rest level determined by the determining unit and controls the pulse motor to perform a rest process based on the thus set rest time.

Further, according to another aspect of this invention, there is provided a pulse motor control method for a printer that includes a pulse motor used for feeding a recording medium, a printing head printing the recording medium, a printer controller for controlling the printing head and a pulse motor controller controlling the pulse motor and comprises, counting an elapsed time after a printing process is started, counting an operating time of the pulse motor, determining a rest level based on the elapsed time and the operating time of the pulse motor, and setting a rest time based on the rest level thus determined and controlling the pulse motor to perform a rest process based on the thus set rest time.

According to one aspect of this invention, a portable printer capable of preventing an excessive temperature rise of the motor at low cost can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

FIG. 3 is an explanatory diagram for illustrating rest level setting information stored in a flash memory.

FIG. 4 is a graph formed based on the rest level setting information shown in FIG. 3.

DETAILED DESCRIPTION

A portable printer according to one embodiment of this invention is explained in detail with reference to the accompanying drawings.

Figure 1:
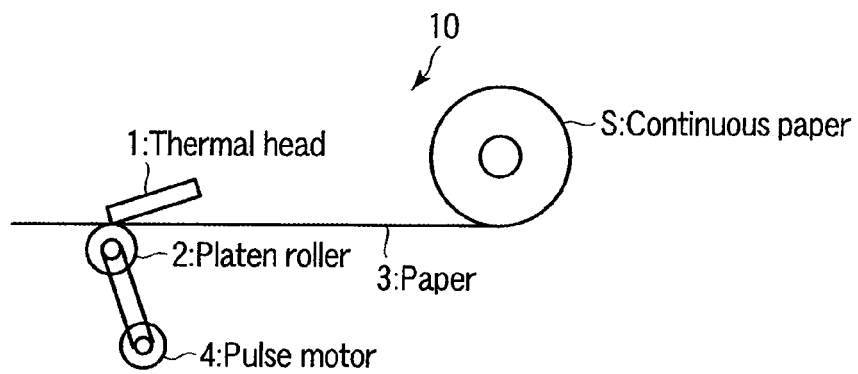
FIG. 1 is a schematic view showing the schematic structure of a portable printer according to one embodiment of this invention.

FIG. 1 is a schematic view showing the schematic structure of a portable printer 10 according to the present embodiment. The portable printer 10 has a printing head (for example, thermal head, inkjet head, dot print head, dye sublimation head) 1 and platen roller 2. The thermal head 1 and platen roller 2 are arranged in facing positions to sandwich paper 3 supplied from continuous rolled paper S (such as receipt paper).

The thermal head 1 is rotatably supported at one end and biased at the other end by a biasing member (not shown) so as to be pressed against the platen roller 2. The platen roller 2 is coupled with a pulse motor 4 via a belt. When the pulse motor 4 is rotated, the platen roller 2 is rotated in connection with rotation of the pulse motor 4 via the belt.

The paper 3 is fed by rotating the platen roller 2 while it is sandwiched between the thermal head 1 and the platen roller 2. The thermal head 1 has a plurality of heating elements arranged in the width direction of the continuous paper S. The thermal head 1 can print various information items on the paper 3, which is thermosensitive paper, by heating those of the plural heating elements which correspond to portions to be printed. In this embodiment, a strobe is supplied to the heating elements arranged in the thermal head to energize the same.

Figure 2:
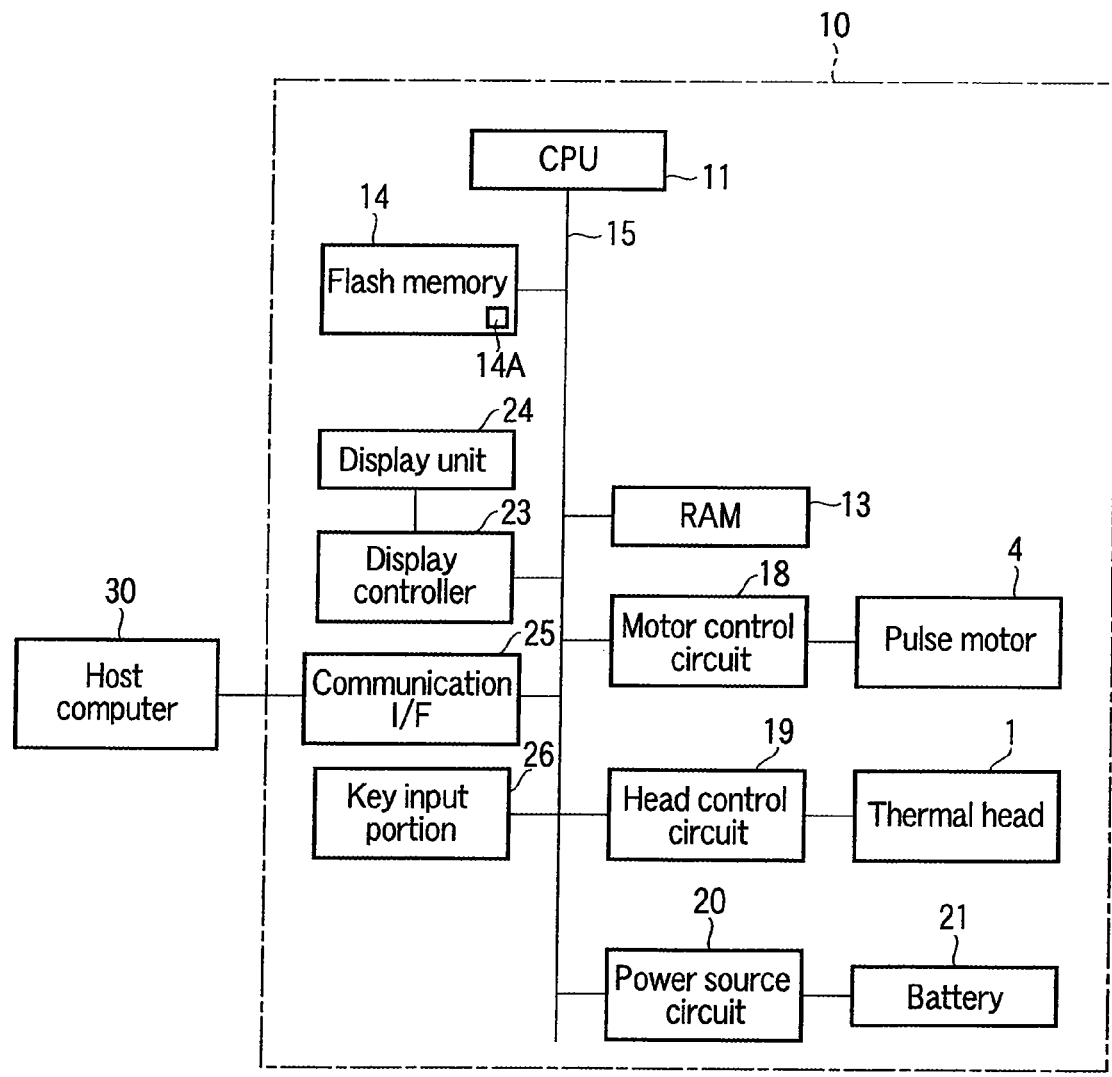
FIG. 2 is a block diagram showing the configuration of the portable printer.

FIG. 2 is a block diagram showing the configuration of the portable printer 10. The portable printer 10 has a CPU 11 that performs various operation processes and controls the respective portions. A memory including a RAM 13 and flash memory 14 is connected to the CPU 11 via a system bus 15.

The flash memory 14 stores an operating program of the portable printer 10. The CPU 11 controls the respective portions by copying the operating program stored in the flash memory 14 into the RAM 13 and executing the same. In the operating program, a program for performing a rest process as described later is contained, for example.

The RAM 13 temporarily stores various variable information items. Further, part of the area of the RAM 13 is used as a printing buffer in which printing data (image data) to be printed on the paper 3 is developed. Printing data is to-be-printed data received from a host computer 30. Printing data may be stored in the flash memory 14.

Further, the CPU 11 is connected to a motor control circuit 18 (pulse motor controller), head control circuit 19 (printer controller) and power source circuit 20.

The motor control circuit 18 drives the pulse motor 4 under control of the CPU 11. The head control circuit 19 supplies a strobe signal to the heating elements arranged in the thermal head 1 to print the information items on the paper 3 according to printing data developed in the printing buffer of the RAM 13 under control of the CPU 11. The power source circuit 20 supplies power stored in a battery 21 to the respective portions to operate the same.

Further, the CPU 11 is connected to a display controller 23, communication interface 25 and key input portion 26.

The display controller 23 controls a display unit 24 under control of the CPU 11. The display unit 24 displays various information items such as a printing state.

The communication interface (I/F) 25 is an interface used to communicate with external equipment such as the host computer 30 (host device). For example, the communication interface 25 is configured by an infrared communication line based on IrDA, USB (Universal Serial Bus), LAN (Local Area Network), RS-232C, Bluetooth (registered trademark) and can communicate with a communication interface provided on the host computer 30.

The key input portion 26 includes various keys operated by the user to input operations to the portable printer 10.

For example, the host computer 30 is configured by a personal computer (PC), portable telephone or handy terminal and performs an operation process in response to an operation input by the user.

As described before, the flash memory 14 has a storage area to store a rest process program executed to perform a rest process. The flash memory 14 further includes a rest level setting information storage portion 14A that stores rest level setting information used in the rest process. The rest level setting information storage portion 14A functions as a storage unit.

FIG. 3 is an explanatory diagram for illustrating rest level setting information stored in the flash memory 14. FIG. 4 is a graph formed based on the rest level setting information shown in FIG. 3.

When the portable printer 10 according to this embodiment is operated in a normal mode, it does not perform a rest process. However, if a preset condition as will be described later is satisfied, the portable printer 10 reads the rest process program from the flash memory 14 and performs an operation in the rest mode.

The rest mode is a mode in which a rest time is provided in which the operation of the pulse motor 4 is interrupted for each printing process. The rest time is set for each rest level and is set by the rest level setting information so as to become gradually longer as the rest level is increased.

The portable printer 10 interrupts the process by the pulse motor 4 for a rest time corresponding to the present rest level for each printing process. The CPU 11 of the portable printer 10 periodically checks the operating condition of the pulse motor 4 at the operation time, determines the rest level in the rest mode and sequentially changes the rest level. That is, the CPU 11 functions as a rest level determining unit.

As shown in FIG. 3, the rest level setting information is configured by setting "Level" indicating the rest level in correspondence to "Rest time" indicating the rest time.

"Feed duty over 100% Rest time" is information indicating the time applied as a rest time in a case where the operating efficiency of the pulse motor 4 is extremely high, for example, where the printing process is continuously performed for over a preset period of time.

For example, in a case where the operating condition of the pulse motor 4 is checked for every 60 seconds, "Feed duty over 100% Rest time" is applied as a rest time if the printing process is continuously performed for 60 seconds or longer. In this case, the condition in which "Feed duty over 100% Rest time" is applied is not limited to a case wherein the printing process is continuously performed for 60 seconds or longer, and the continuous time of the printing process set as the condition can be adequately changed.

As shown in FIG. 4, a rest time corresponding to a rest level is set longer as the rest level becomes higher. Further, the time for "Feed duty over 100% Rest time" is set longer in comparison with "Rest time".

Figure 5:
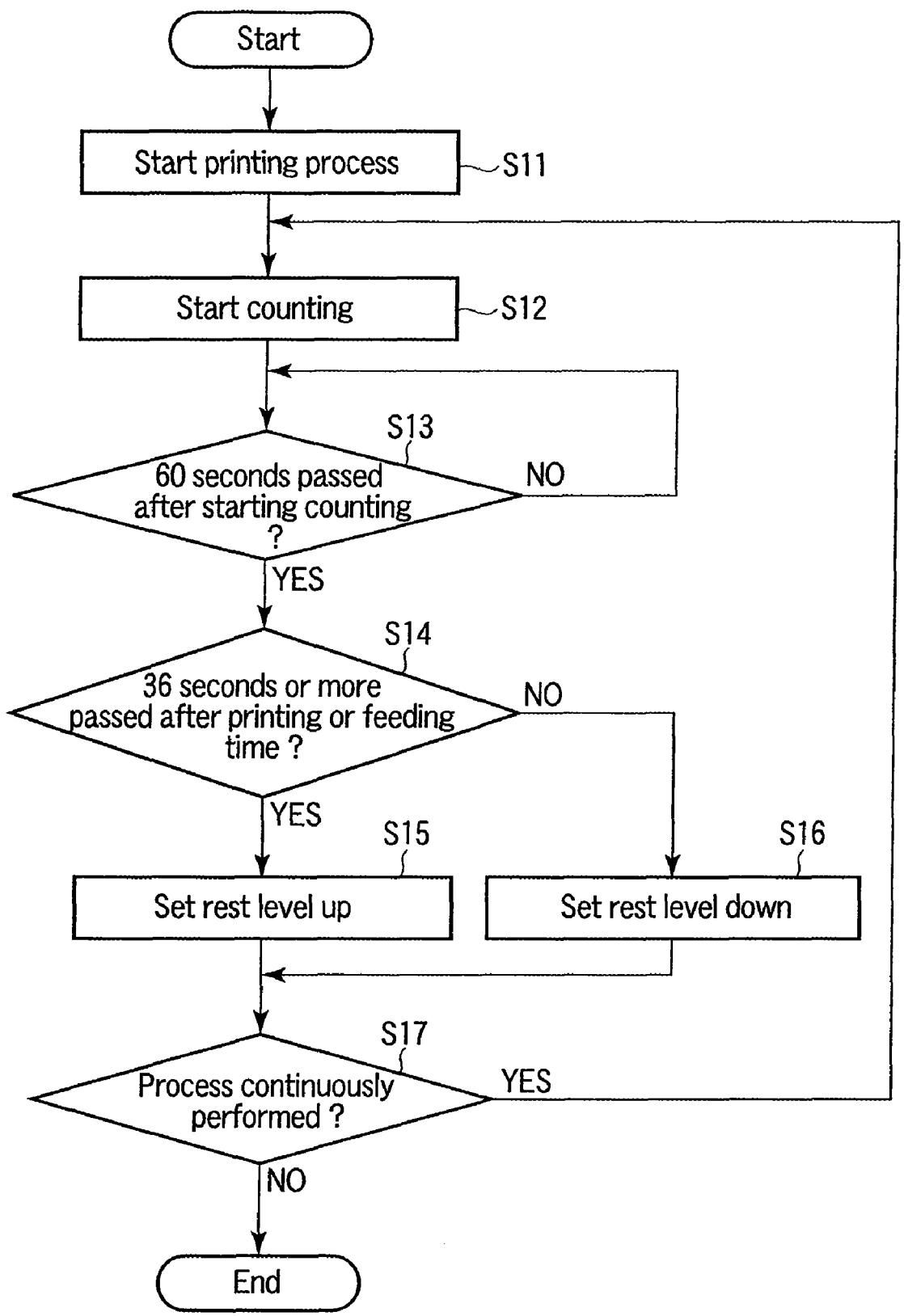
FIG. 5 is a flowchart for illustrating a rest level determination process performed in the portable printer shown in FIGS. 1 and 2.

FIG. 5 is a flowchart for illustrating a rest level determination process performed in the portable printer 10 shown in FIGS. 1 and 2. In this embodiment, it is supposed that the operating efficiency of the pulse motor 4 is checked for every 60 seconds.

First, the CPU 11 of the portable printer 10 starts the printing process (Act 11). When performing the printing process, the CPU 11 develops printing data in the printing buffer of the RAM 13. The CPU 11 controls the motor control circuit 18 and drives the platen roller 2 by rotating the pulse motor 4 to feed the paper 3 to the mounting position of the thermal head 1. Further, the CPU 11 controls the head control circuit 19 to energize corresponding heating elements of the thermal head 1 based on printing data developed in the printing buffer of the RAM 13.

When the printing process is performed in the rest mode, the CPU 11 starts a counting operation at the same time as the printing process is started (Act 12). In this case, the CPU 11 functions as a counter that counts the elapsed time after the printing process is started. The counter may be designed to count the elapsed time after the power source is turned on.

Further, at this time, the CPU 11 checks the operation state of the pulse motor 4. That is, the CPU 11 counts the time during which the pulse motor 4 is operated for printing or feeding by checking the state of the motor control circuit 18. In this case, the CPU 11 functions as a counter for counting operating time of the pulse motor 4.

The CPU 11 determines the operating efficiency of the pulse motor 4 based on the elapsed time after starting the printing process and the operating time of the pulse motor 4 within the elapsed time. That is, the CPU 11 functions as an operating efficiency determining unit.

When starting the counting operation, the CPU 11 always determines whether or not 60 seconds has passed after the counting operation is started (Act 13). If 60 seconds has passed after the counting operation is started (YES in Act 13), the CPU 11 determines whether or not the time required for printing or feeding is not shorter than 36 seconds in the period of 60 seconds that has passed after starting the counting operation (Act 14). That is, the CPU 11 determines whether or not the pulse motor 4 is operated for 36 seconds or more in the period of 60 seconds that has passed after starting the counting operation.

When it is determined that time required for printing or feeding is not shorter than 36 seconds in the period of 60 seconds that has passed after starting the counting operation (YES in Act 14), the CPU 11 raises the present rest level by one Act (Act 15). The rest level is set at "1" in the initial stage in which the printing process is started in the rest mode. That is, if the present rest level is "1", the CPU 11 sets the rest level to "2".

When it is determined that the time required for printing or feeding is shorter than 36 seconds in the period of 60 seconds that has passed after starting the counting operation (NO in Act 14), the CPU 11 lowers the present rest level by one Act (Act 16). That is, if the present rest level is "2", the CPU 11 sets the rest level to "1". Since the rest level "1" is the lowest level, the CPU 11 maintains the present rest level without lowering the rest level if the present rest level is set at "1".

When the rest level is re-set, the CPU 11 determines whether or not the printing process is continuously performed (Act 17). If it is determined that the printing process is continuously performed (YES in Act 17), the CPU 11 returns the process to the Act 12 and performs the process of the Act 12 to the Act 16 again. If it is determined that the printing process is not continuously performed (NO in Act 17), the CPU 11 terminates the process.

Figure 6:
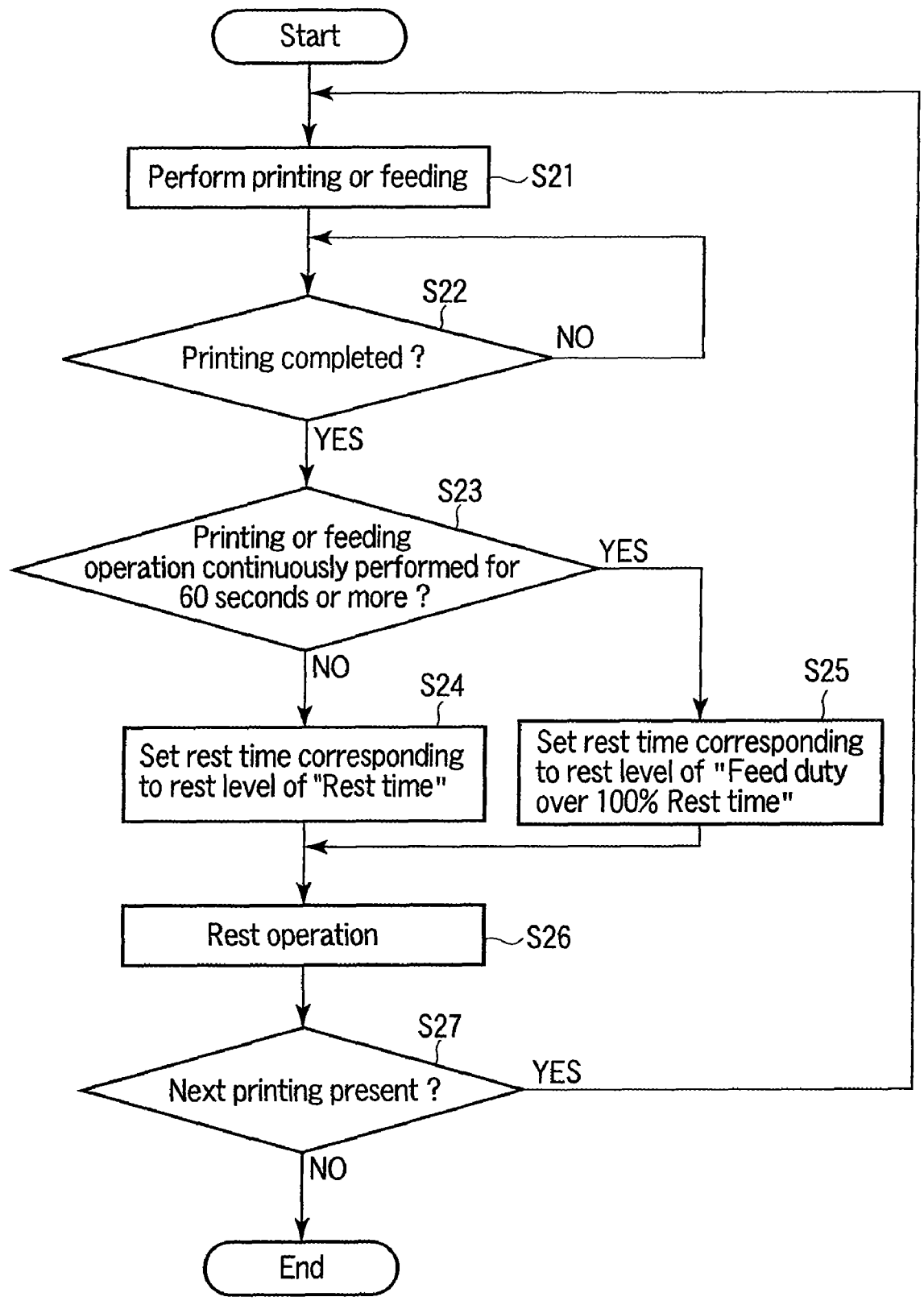
FIG. 6 is a flowchart for illustrating a rest process performed in the portable printer shown in FIGS. 1 and 2.

FIG. 6 is a flowchart for illustrating the rest process performed in the portable printer 10 shown in FIGS. 1 and 2.

When starting the printing process, the CPU 11 of the portable printer 10 controls the respective portions based on printing data and performs the printing and feeding operations (Act 21). When the printing and feeding operations are started, the CPU 11 is set into a state in which it waits until the printing and feeding operations are terminated (Act 22). That is, the CPU 11 determines whether the printing operation for one piece of printing data is completed or not.

When it is determined that the printing and feeding operations are terminated (YES in Act 22), the CPU 11 determines whether or not the time required for printing and feeding is not shorter than 60 seconds (Act 23).

If it is determined that the time required for printing and feeding is shorter than 60 seconds (NO in Act 23), the CPU 11 sets a time corresponding to the present rest level among the time indicated by "Rest time" shown in FIG. 3 to rest time (Act 24). For example, when the time required for printing and feeding is shorter than 60 seconds and the present rest level is set at "5", the CPU 11 sets 2.6 seconds as the rest time.

If it is determined that the time required for printing and feeding is longer than or equal to 60 seconds (YES in Act 23), the CPU 11 sets the time corresponding to the present rest level among the time indicated by "Feed duty over 100% Rest time" shown in FIG. 3 to the rest time (Act 25). For example, when the time required for printing and feeding is longer than or equal to 60 seconds and the present rest level is set at "5", the CPU 11 sets 7.1 seconds as the rest time.

If the rest time is set, the CPU 11 performs a rest operation (Act 26). That is, the CPU 11 controls the motor control circuit 18 to interrupt the pulse motor 4 for the rest time set in the Act 24 or S25. In other words, the CPU 11 functions as a controller that controls the motor control circuit 18 to perform the rest process based on the set rest time.

The CPU 11 determines whether next printing data is present or not after the rest time has elapsed (Act 27). If next printing data is present (YES in Act 27), the CPU 11 returns the process to the Act 21 and performs the process of the Acts 21 to 26 again. If next printing data is not present (NO in Act 27), the CPU 11 terminates the process.

As described above, according to one embodiment of this invention, the rest levels and rest times that are set to correspond to one another are previously stored. The operating efficiency of the pulse motor is checked for every preset time after the printing process is started, the operating efficiency is determined based on the operating time of the pulse motor and the rest level is sequentially determined according to the operating efficiency. When the printing process for printing data of one paper sheet is terminated, the operation of the pulse motor is interrupted for a rest time corresponding to the thus determined rest level and then a process for next printing data is performed after the rest time has elapsed.

The portable printer with the above configuration can adequately pause the operation of the pulse motor without using a temperature sensor. As a result, a portable printer capable of preventing an excessive temperature rise of the motor at low cost can be provided.

This invention is not limited to the above embodiment itself and can be embodied by modifying the constituents without departing from the technical scope thereof in the embodying stage. Further, various inventions can be made by adequately combining a plurality of constituents disclosed in the above embodiment. For example, some constituents may be omitted from all of the constituents disclosed in the above embodiment. In addition, constituents in different embodiments can be adequately combined.

According to the above embodiment, a case wherein the operating efficiency of the pulse motor 4 is checked for every 60 seconds is explained, but this invention is not limited to this case. For example, the operating efficiency of the pulse motor 4 may be checked for every desired time period, for example, for every 30 seconds or 120 seconds.

Further, a case wherein the rest level is raised when the operation is performed for 36 seconds or longer in 60 seconds and the rest level is lowered when the operating time is shorter than 36 seconds is explained, but this invention is not limited to this case. For example, the operating time used as a reference to determine whether the rest level is raised or lowered can be appropriately changed. That is, the elapsed time after the printing process is started is set to a predetermined time and the rest level is determined based on whether or not the operating time of the pulse motor is shorter than this preset time. Thus, the rest level is determined based on the operating efficiency in the counted time period.

Further, in FIG. 3, the rest times in the respective rest levels are shown, but the rest times are not limited to those shown in the drawing. The rest time can be appropriately changed according to the characteristic of the pulse motor 4, for example, according to the operation by use of the key input portion 26.

Further, an upper limit is set for the rest level and if the upper limit rest level is reached, a process for maintaining the present rest level or lowering the rest level may be performed.

In addition, whether the rest level is raised or lowered is determined based on time required for printing or feeding in the period of 60 seconds after the counting operation is started. However, this invention is not limited to this case. The process of determining whether or not the rest level is raised and the process of determining whether or not the rest level is lowered can be individually performed.

For example, it is possible to set a period of 60 seconds after start of the counting operation to one segment, determine whether the rest level is raised or not based on the time required for printing or feeding in one segment and determine whether the rest level is lowered or not based on time required for printing or feeding in two segments. In a case where it is determined that the rest level is raised in the process of determining whether the rest level is raised or not and it is determined that the rest level is lowered in the process of determining whether the rest level is lowered or not, the present rest level is maintained without changing the rest level.

That is, CPU 11 determines that a rest level is to be raised in a case where, while the predetermined time counted by the first counter is set as one segment, the time counted by the second counter is not shorter than the preset time in the segment and determines that a rest level is to be raised in a case where time counted by the second counter is not shorter than the preset time in two segments counted by the first counter.

Further, a case wherein the portable printer 10 sets the rest time based on the present rest level by referring to the rest level setting information having the rest levels and rest times set in one-to-one correspondence is explained, but this invention is not limited to this case. For example, the configuration may be made to previously store an equation used for calculating the rest time based on a rest level and calculate the rest time as required.

According to the above embodiment, the printing head 1 is explained as the thermal head 1, but it is not limited thereto. For example, the printing head 1 may have any configuration if it prints the paper 3 fed by the pulse motor 4. Further, in this embodiment, the process of controlling the pulse motor 4 of the portable printer is explained, but this invention can be similarly applied to a stationary printer if it uses a pulse motor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printer having a pulse motor for feeding a recording medium, comprising:

a printing head that prints information items onto the recording medium;
a printer controller for controlling the print head;
a first counter for counting an elapsed time after a printing process is started;
a second counter for counting operating time of the pulse motor;
a determining unit determining a rest level based on times counted by the first and second counters; and
a controller that sets a rest time based on the rest level determined by the determining unit and controls the pulse motor to perform a rest process based on the thus set rest time,
wherein the determining unit determines that a rest level is to be raised in a case where, while a predetermined time counted by the first counter is set as one segment, the time counted by the second counter is not shorter than a preset time in the segment and determines that a rest level is to be raised in a case where the time counted by the second counter is not shorter than the preset time in two segments counted by the first counter.

2. A pulse motor control method for a printer that includes a pulse motor used for feeding a recording medium, a printing head printing the recording medium, a printer controller for controlling the printing head and a pulse motor controller controlling the pulse motor, comprising:

counting an elapsed time after a printing process is started,
counting an operating time of the pulse motor,
determining a rest level based on the elapsed time and the operating time of the pulse motor, and
setting a rest time based on the rest level thus determined and controlling the pulse motor to perform a rest process based on the thus set rest time,
wherein it is determined that a rest level is to be raised in a case where the operating time of the pulse motor is not shorter than a preset time in one segment while a predetermined time within the lapsed time after the printing process is started is set as one segment, and it is determined that a rest level is to be raised in a case where the operating time of the pulse motor is not shorter than the preset time in two segments.

* * * * *